(12) United States Patent
Ichikura et al.

(10) Patent No.: US 11,466,973 B2
(45) Date of Patent: Oct. 11, 2022

(54) ROTATION ANGLE DETECTION APPARATUS

(71) Applicant: TOKYO COSMOS ELECTRIC CO., LTD., Zama (JP)

(72) Inventors: Manabu Ichikura, Tokyo (JP); Kentaro Higa, Kanagawa (JP)

(73) Assignee: TOKYO COSMOS ELECTRIC CO., LTD., Zama (JP)

( * ) Notice: Subject to any disclaimer, the term of this patent is extended or adjusted under 35 U.S.C. 154(b) by 38 days.

(21) Appl. No.: 17/111,670

(22) Filed: Dec. 4, 2020

(65) Prior Publication Data

US 2021/0172720 A1    Jun. 10, 2021

(30) Foreign Application Priority Data

Dec. 5, 2019  (JP) .............................. JP2019-220280

(51) Int. Cl.
  *G01B 7/30*    (2006.01)
  *G01D 5/04*    (2006.01)
  *G01D 5/14*    (2006.01)

(52) U.S. Cl.
  CPC ................. *G01B 7/30* (2013.01); *G01D 5/04* (2013.01); *G01D 5/14* (2013.01)

(58) Field of Classification Search
  CPC ............... G01B 7/30; G01D 5/04; G01D 5/14
  See application file for complete search history.

(56) References Cited

U.S. PATENT DOCUMENTS

| 5,282,775 | A  | * | 2/1994 | Teraoka ................ | F16H 48/285 |
| | | | | | 475/248 |
| 6,186,757 | B1 | * | 2/2001 | Pippes .................... | F04C 2/102 |
| | | | | | 29/888.023 |
| 6,314,642 | B1 | * | 11/2001 | Thompson .............. | F04C 2/101 |
| | | | | | 29/888.023 |

FOREIGN PATENT DOCUMENTS

JP      57-037205     2/1982
JP      2014-167427   9/2014

* cited by examiner

*Primary Examiner* — Reena Aurora
(74) *Attorney, Agent, or Firm* — Amin, Turocy & Watson, LLP

(57) ABSTRACT

A rotation angle detection apparatus capable of reducing the cost and having a small thickness is provided. The rotation angle detection apparatus includes: a housing; a rotating shaft rotatably disposed in the housing; a first internal gear disposed concentrically with the rotating shaft and fixed to the housing; a second internal gear disposed concentrically with the rotating shaft, and rotatably disposed in the housing, the second internal gear having a number of teeth different from a number of teeth of the first internal gear; an external gear rotatably disposed at a position separated from the rotating shaft in rotating body, the external gear meshing with the first internal gear and the second internal gear; and a detection section that detects a rotation angle of the second internal gear.

7 Claims, 9 Drawing Sheets

ROTATION ANGLE DETECTION APPARATUS

CROSS REFERENCE TO RELATED APPLICATIONS

The entire disclosure of Japanese patent Application No. 2019-220280 filed on Dec. 5, 2019, is incorporated herein by reference in its entirety.

TECHNOLOGICAL FIELD

The present invention relates to a rotation angle detection apparatus.

BACKGROUND ART

Potentiometers, for example, are known as conventional rotation angle detection apparatuses. Such potentiometers detect the rotation angle of a rotating component of office automation equipment, industrial machines or the like, or an amount of wire unwound from a drum as a moving amount. Some of such rotation angle detection apparatuses detect multiple rotations (for example, several tens of rotations) of a rotating component and/or a drum. For detecting multiple rotations of the rotating component or the like, for example, a reduction mechanism capable of obtaining a large reduction ratio is required.

For example, Japanese Patent Application Laid-Open No. 2014-167427 discloses a potentiometer including a shaft, four spur gears and a reduction mechanism that decelerates the rotation of the shaft to convert the rotation angle of the decelerated spur gear to a voltage.

Further, for example, Japanese Utility Model (Registration) Application Laid-Open No. S57-037205 discloses a potentiometer that includes a screw, a worm gear rotating integrally with the screw, a gear meshing with the worm gear, and an indicator rotating together with the gear.

CITATION LIST

Patent Literature

PTL 1
Japanese Patent Application Laid-Open No. 2014-167427
PTL 2
Japanese Utility Model (Registration) Application Laid-Open No. S57-037205

SUMMARY OF INVENTION

Technical Problem

However, the potentiometer described in PTL 1 requires gears of small diameter for obtaining a large reduction ratio. It is also necessary to increase the dimensional accuracy and assembly accuracy of gears and bearing portions of the gears, thus increasing the cost. When gears are disposed in multiple stages in order to obtain a large reduction ratio, it is necessary to increase, for example, the length in the rotating shaft direction of the gears (i.e., depth direction), and thus making the apparatus thin becomes disadvantageously difficult.

In addition, the potentiometer described in PTL 2 requires increase of the dimensional accuracy and assembly accuracy of its worm gear and gear, thereby disadvantageously increasing the cost. Further, the rotating shaft of the worm gear and the rotating shaft of the gear are disposed orthogonally, thus disadvantageously increasing the size of the potentiometer and the area of a mounting surface of the potentiometer.

An object of the present invention is to provide a rotation angle detection apparatus capable of reducing the cost and having a small thickness.

Solution to Problem

To achieve the above object, a rotation angle detection apparatus in the present invention includes:
a housing;
a rotating shaft rotatably disposed in the housing;
a rotating body disposed so as to rotate integrally with the rotating shaft;
a first internal gear disposed concentrically with the rotating shaft, and fixed to the housing;
a second internal gear disposed concentrically with the rotating shaft, and rotatably disposed in the housing, the second internal gear having a number of teeth different from the number of teeth of the first internal gear;
an external gear rotatably disposed at a position separated from the rotating shaft in the rotating body, the external gear meshing with the first internal gear and the second internal gear; and
a detection section that detects a rotation angle of the second internal gear.

BRIEF DESCRIPTION OF DRAWINGS

The advantageous features provided by one or more embodiments of the invention will become more fully understandable from the detailed description given hereinbelow and the appended drawings which are given by way of illustration only, and thus are not intended as a definition of the limits of the present invention.

DESCRIPTION OF EMBODIMENTS

Hereinafter, one or more embodiments of the present invention will be described with reference to the drawings. However, the scope of the invention is not limited to the disclosed embodiments.

Hereinafter, one or more embodiments of the present invention will be described with reference to the drawings.

Figure 1:
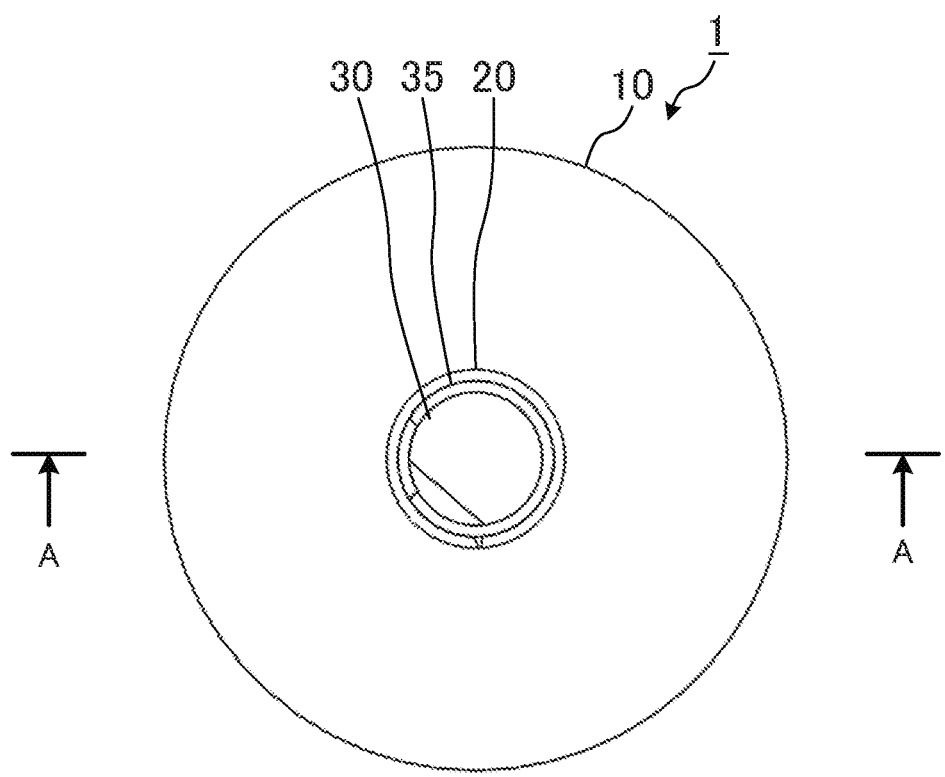
FIG. 1 is a plan view illustrating an exemplary rotation angle detection apparatus according to an embodiment of the present invention.
Figure 2:
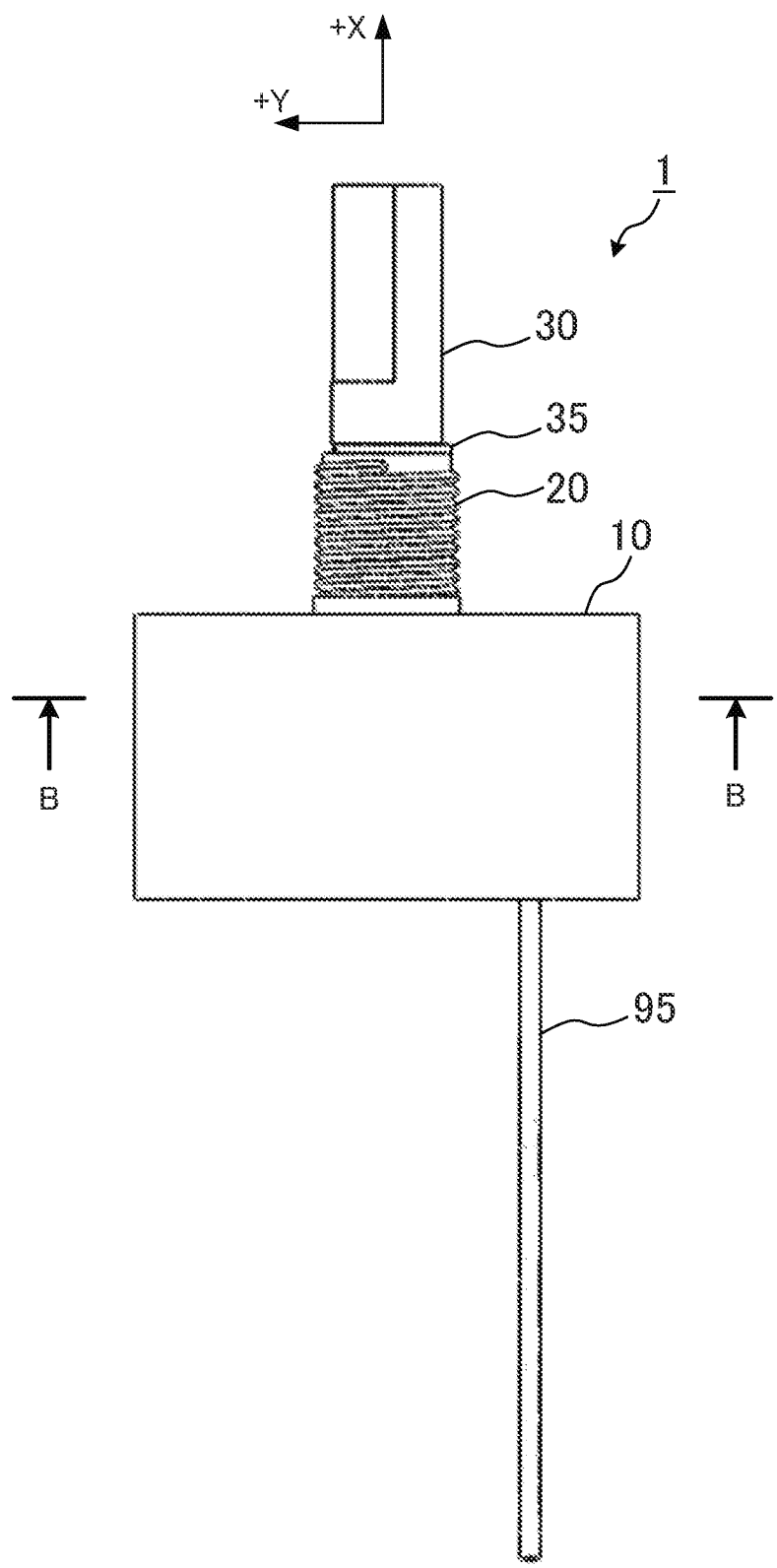
FIG. 2 is a front view illustrating the exemplary rotation angle detection apparatus according to the embodiment of the present invention.
Figure 3:
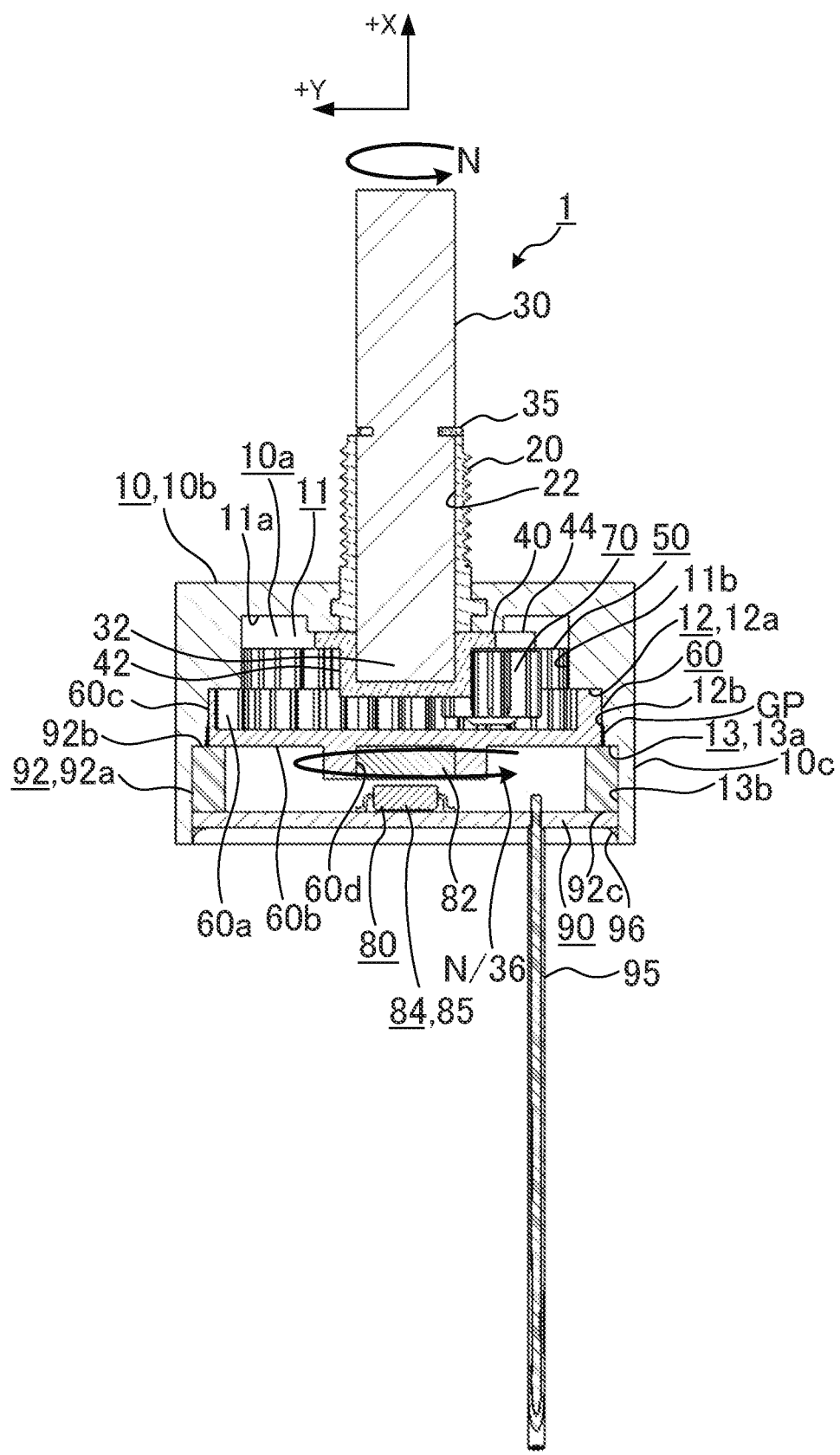
FIG. 3 is a cross-sectional view taken along line A-A of FIG. 1.

FIG. 1 is a plan view illustrating an exemplary rotation angle detection apparatus 1 according to an embodiment of the present invention. FIG. 2 is a front view illustrating the exemplary rotation angle detection apparatus 1 according to the embodiment of the present invention. FIG. 3 is a cross-sectional view taken along line A-A of FIG. 1. FIG. 2 illustrates the X axis and Y axis. In FIG. 2, the vertical direction is referred to as the X direction or the axial direction, upward is referred to as the upper side, "+X side" or +X direction," and downward is referred to as the lower side, "−X side" or "−X direction." In FIG. 2, the horizontal direction is referred to as the Y direction or the radial direction, the direction moving away from the X axis is referred to as radically outward or the "+Y direction," and the direction approaching the X axis is referred to as radically inward or the "−Y direction."

As shown in FIGS. 1 to 3, rotation angle detection apparatus 1 includes case (housing) 10, mounting screw 20, shaft 30 (rotating shaft), rotating body 40, fixed-side internal gear 50 (first internal gear), movable-side internal gear 60 (second internal gear), external gear 70, detection section 80 and wiring board 90.

Case 10 has a substantially cylindrical shape, and in the center of case 10, hole 10a extending upward is provided from the lower end. In other words, case 10 has a bottomed cylindrical shape and is provided with disc portion 10b and cylinder portion 10c extending downward from the disc portion 10.

Disc portion 10b has an outer shape of a disc with the X axis as its center. Cylinder portion 10c has an outer shape of a cylinder with the X axis as its center. First space 11 is formed on the back end side (upper end side) of hole 10a. First space 11 is defined by circular surface 11a facing downward (−X direction) and inner peripheral surface 11b located below surface 11a and facing radically inward (−Y direction).

Second space 12 (corresponding to the "accommodation space" of the present invention) is formed so as to extend radially outward (+Y direction) from the lower end edge of inner peripheral surface 11b. Second space 12 is defined by annular surface 12a, which is located radially outward from the lower end edge of inner peripheral surface 11b and faces downward (−X direction), and inner peripheral surface 12b, which is located below surface 12a and faces radically inward (−Y direction).

Third space 13 is formed so as to extend radially outward (+Y direction) from the lower end edge of inner peripheral surface 12b. Third space 13 is defined by annular surface 13a, which is located radially outward from the lower end edge of inner peripheral surface 12b and faces downward (−X direction), and inner peripheral surface 13b, which is located below surface 13a and faces radically inward (−Y direction).

Mounting screw 20 is insert-molded into the central portion of disc portion 10b of case 10. Mounting screw 20 includes through hole 22 extending along the axial direction (X direction).

Shaft 30 is rotatably disposed in case 10. Shaft 30 extends in the vertical direction (X direction). Shaft 30 is rotatably supported by mounting screw 20. Shaft 30 is inserted through the through hole 22. Lower end portion 32 of shaft 30 protrudes into first space 11.

E-ring 35 fits to shaft 30. The movement of shaft 30 in the −X direction is restricted by the contact of E-ring 35 with the peripheral edge of the upper end opening of through hole 22. Lower end portion of shaft 30 is insert-molded into rotating body 40. The movement of shaft 30 in the +X direction is restricted by the contact of rotating body 40 with surface 11a.

Figure 4:
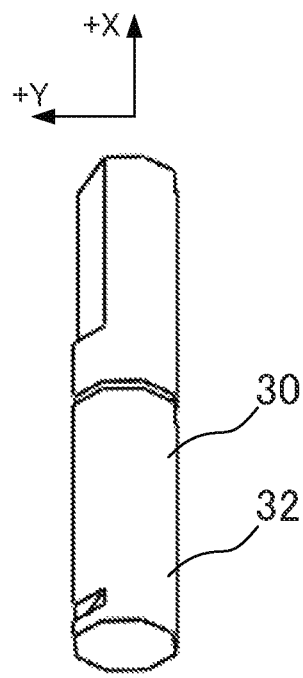
FIG. 4 is a partially exploded perspective view showing a part of the rotation angle detection apparatus.
Figure 4:
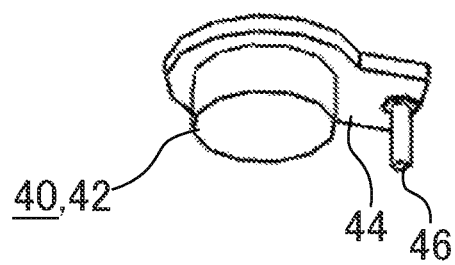
Figure 4:
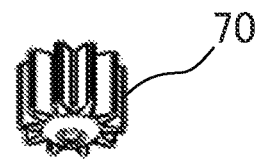

FIG. 4 is a partially exploded perspective view showing a part of rotation angle detection apparatus 1.

As shown in FIGS. 3 and 4, rotating body 40 includes outer fitting portion 42, arm portion 44 and stem portion 46. As described above, the lower end portion of shaft 30 is insert-molded into rotating body 40. As a result, rotating body 40 rotates integrally with shaft 30. Specifically, outer fitting portion 42 fits to the outer periphery of lower end portion 32 of shaft 30. Arm portion 44 extends radially outward (+Y direction) from outer fitting portion 42. Stem portion 46 is disposed at the distal end of arm portion 44. Stem portion 46 extends in the vertical direction (X direction).

Figure 5:
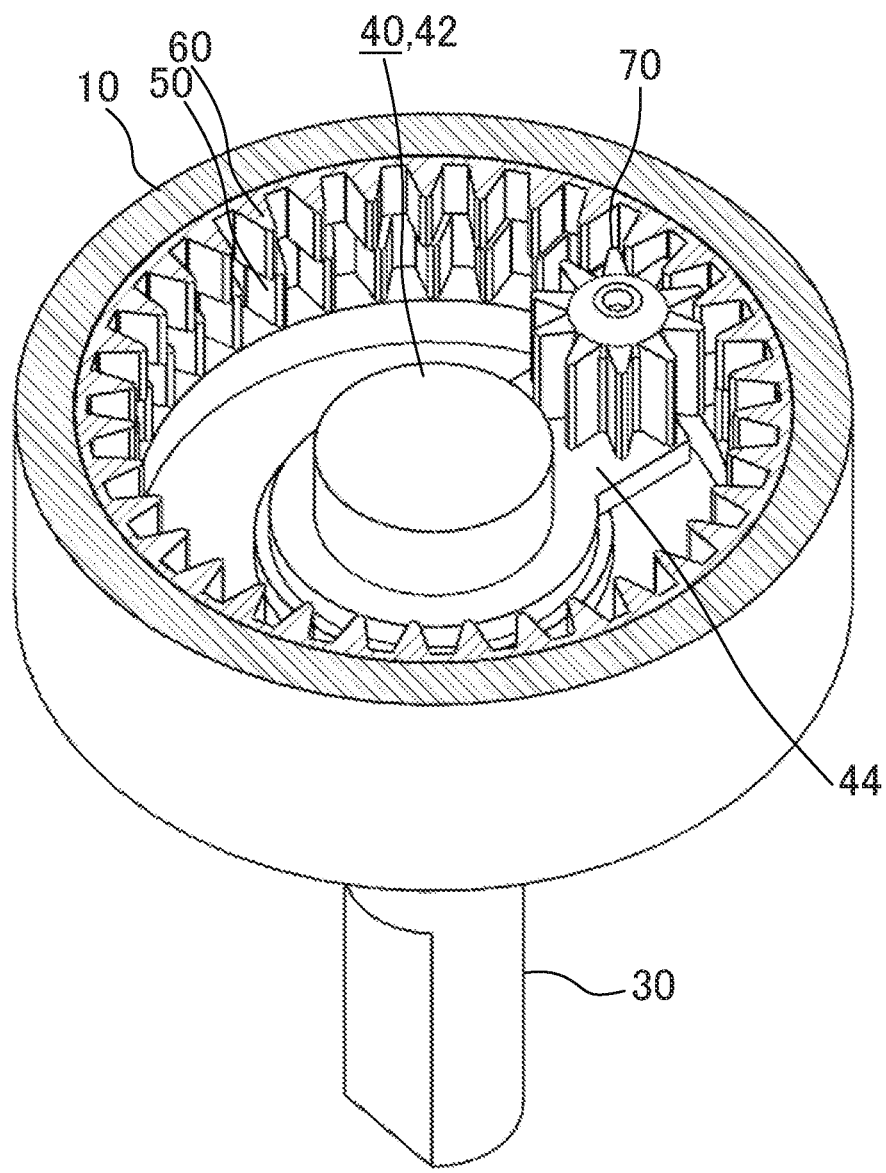
FIG. 5 is a perspective view illustrating the interior of the rotation angle detection apparatus.
Figure 6:
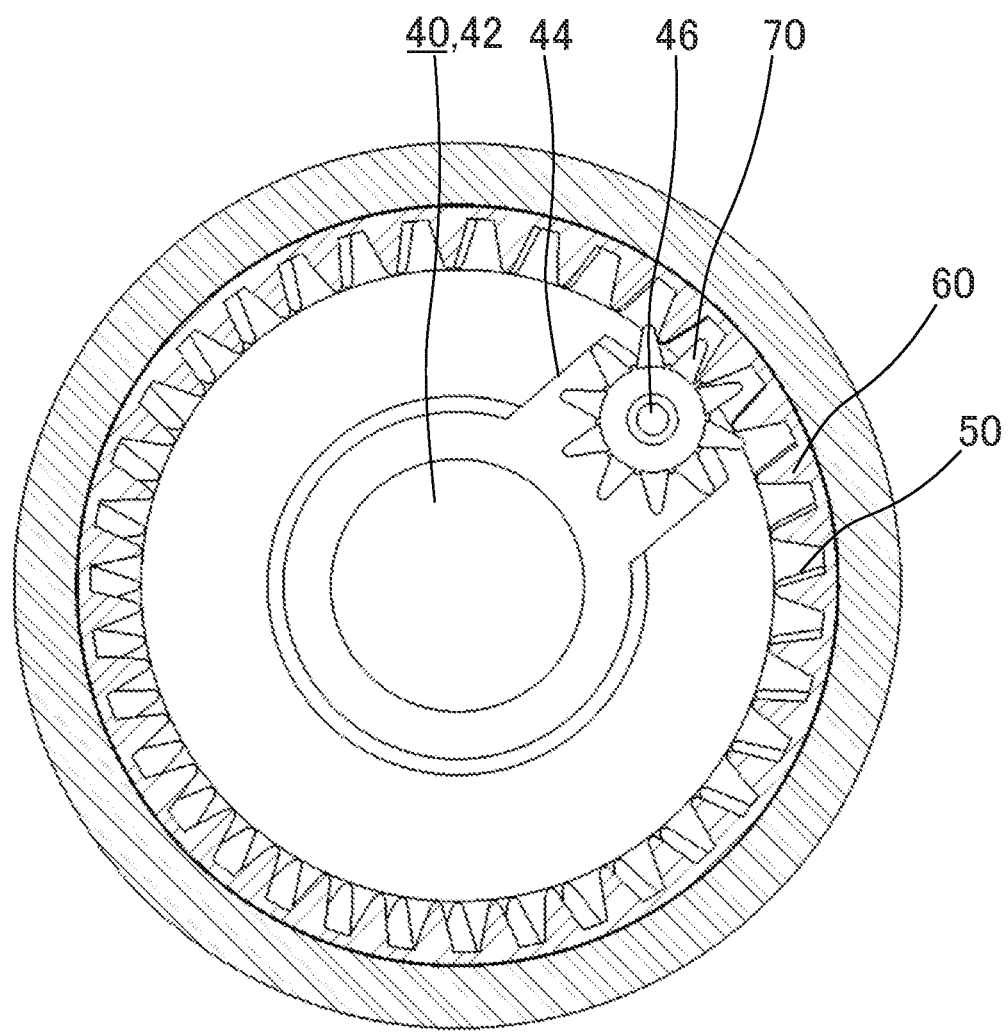
FIG. 6 is a cross-sectional view taken along line B-B of FIG. 2.

FIG. 5 is a perspective view illustrating the interior of rotation angle detection apparatus 1. FIG. 6 is a cross-sectional view taken along line B-B of FIG. 2.

The tooth portion of fixed-side internal gear 50 is formed on the lower end portion side in inner peripheral surface 11b as shown in FIGS. 3, 5 and 6. The number of teeth of fixed-side internal gear 50 is, for example, 36.

Movable-side internal gear 60 is rotatably fitted into second space 12 as shown in FIGS. 3, 5 and 6. Specifically, movable-side internal gear 60 is rotatably fitted into a space defined by surface 12a, upper end surface 92b (described below) of spacer 92 that is disposed to be in contact with surface 13a, and inner peripheral surface 12b. Movable-side internal gear 60 is disposed so as to overlap (substantially flush with) fixed-side internal gear 50 in the vertical direction (X direction). In other words, fixed-side internal gear 50 and movable-side internal gear 60 are aligned in two stages, i.e., the upper and lower stages.

As shown in FIG. 3, movable-side internal gear 60 has a disc shape, and hole 60a recessed downward from the upper end is provided in the center of movable-side internal gear 60. In other words, movable-side internal gear 60 includes disc-shaped bottom portion 60b and ring-shaped portion 60c extending upward from disc-shaped bottom portion 60b.

Disc-shaped bottom portion 60b includes fitting recess 60d. Fitting recess 60d is a hole opened downward. The bottom wall surface of fitting recess 60d is a downward facing surface of disc-shaped bottom portion 60b. The peripheral wall of fitting recess 60d protrudes from second space 12 to third space 13.

The teeth of movable-side internal gear 60 is formed on the inner peripheral surface of ring-shaped portion 60c as shown in FIG. 3. The number of teeth of movable-side internal gear 60 is, for example, 35.

Figure 7:
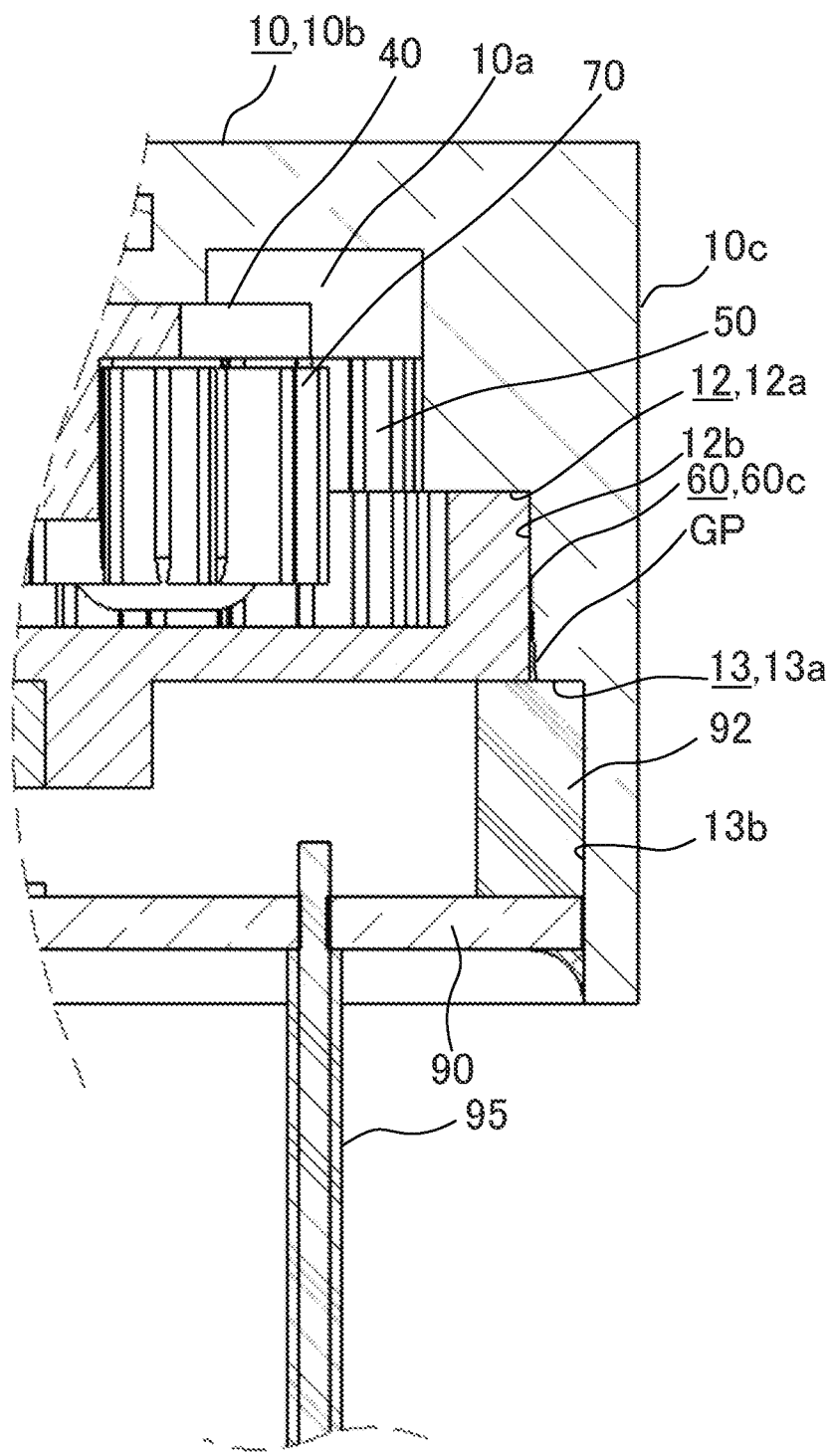
FIG. 7 is a partially enlarged view of FIG. 3.

FIG. 7 is a partially enlarged view of FIG. 3. As shown in FIGS. 3 and 7, inner peripheral surface 12b is separated radially outward (+Y direction) relative to the outer peripheral surface of ring-shaped portion 60c. Gap GP is thus provided between the outer peripheral surface of ring-shaped portion 60c and inner peripheral surface 12b. Gap GP extends radially outward (+Y direction) relative to ring-shaped portion 60c. Gap GP has a size from 0.5% to 5% relative to the diameter of movable-side internal gear 60. Further, gap GP is wider on the lower end side of the outer peripheral portion of movable-side internal gear 60 (−X side) than on the upper end side of the outer peripheral portion of movable-side internal gear 60 (+X side). Furthermore, inner peripheral surface 12b is inclined radially outward (in +Y direction) relative to the −X direction in gap GP on −X side. Gap GP thus becomes wider in the radially outward direction from the upper side toward the lower side on the −X side. The gap GP contains a lubricant having a consistency of 200 to 350.

External gear 70 is rotatably supported by stem portion 46 as shown in FIGS. 3 to 6. External gear 70 meshes with fixed-side internal gear 50 and movable-side internal gear 60.

Rotating body 40, fixed-side internal gear 50, movable-side internal gear 60 and external gear 70 constitute a hypocycloid mechanism. The number of teeth of fixed-side internal gear 50 is, for example, 36. The number of teeth of movable-side internal gear 60 is, for example, 35. As a result, when shaft 30 rotates 36 times, movable-side internal gear 60 makes one rotation in the rotation direction of shaft 30. That is, the reduction ratio of movable-side internal gear 60 to rotating body 40 (shaft 30) is 1/36. In other words, when the rotation number of shaft 30 is N (N is a natural number), the rotation number of movable-side internal gear 60 is N/36. Therefore, rotation angle detection apparatus 1 according to the present embodiment can detect a rotation angle of a rotating component or a drum in a range from 0 degree to 36 rotations of shaft 30 (=36*360 degrees).

Detection section 80 includes magnet 82 and integrated circuitry 84 as shown in FIG. 3. Magnet 82 is disposed at disc-shaped bottom portion 60b. Specifically, magnet 82 is fitted to fitting recess 60d. For magnet 82, for example, a disk-shaped neodymium magnet magnetized in the radial direction is used.

Integrated circuit 84 is implemented on wiring board 90. Integrated circuit 84 includes magnetic sensor 85. Magnetic sensor 85 is disposed so as to face magnet 82 and be separated from magnet 82 by a predetermined distance in the vertical direction (X direction). Magnetic sensor 85 converts the direction of the magnetic field emitted from magnet 82 into a change in an electric signal (for example, voltage) and outputs the change.

Figure 8:
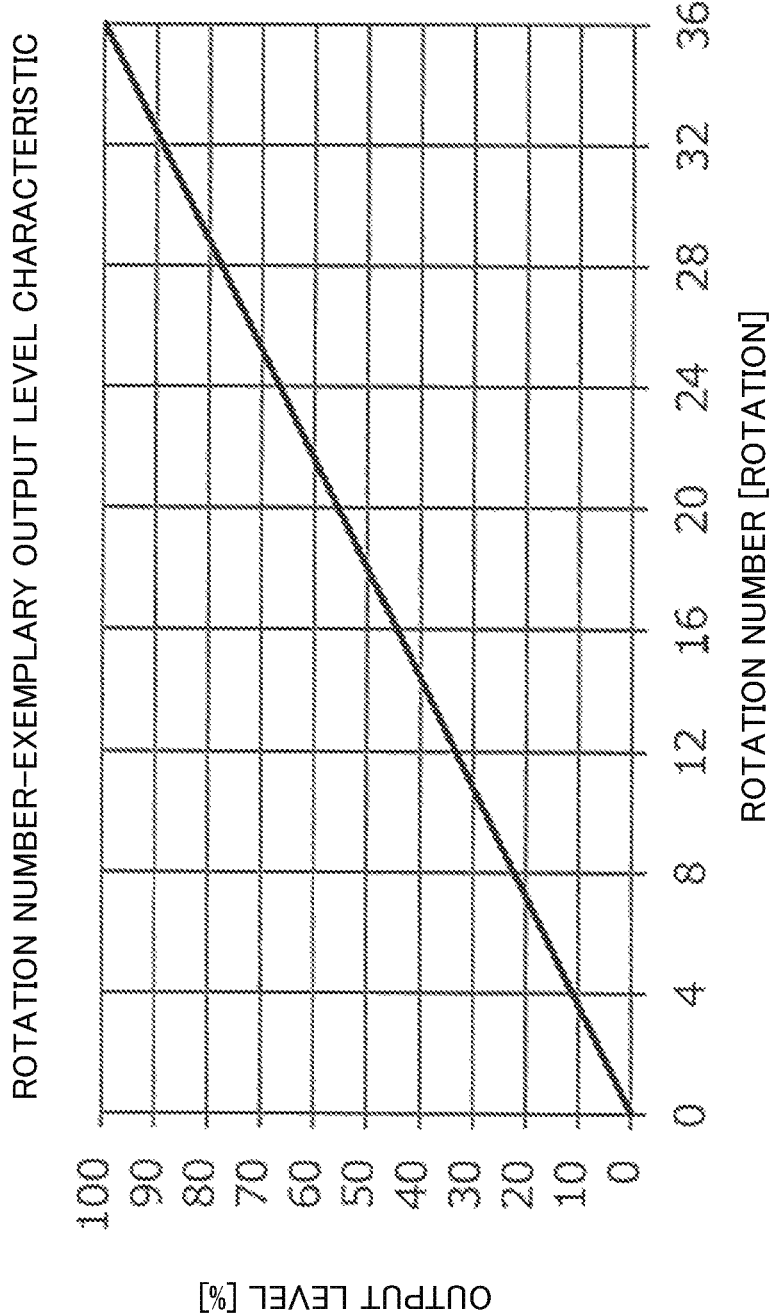
FIG. 8 shows an exemplary correspondence relationship between rotation number of shaft and output level.

FIG. 8 shows an exemplary correspondence relationship between rotation number of shaft 30 and output level from magnetic sensor 85. The abscissa represents the rotation number of shaft 30, and the ordinate represents the output level [%] in FIG. 8. The correspondence relationship shown in FIG. 8 shows that, for example, the output level of magnetic sensor 85 is 50% when shaft 30 rotates 18 times. Further, when shaft 30 rotates 36 times, the output level of magnetic sensor 85 becomes 100%.

Figure 9:
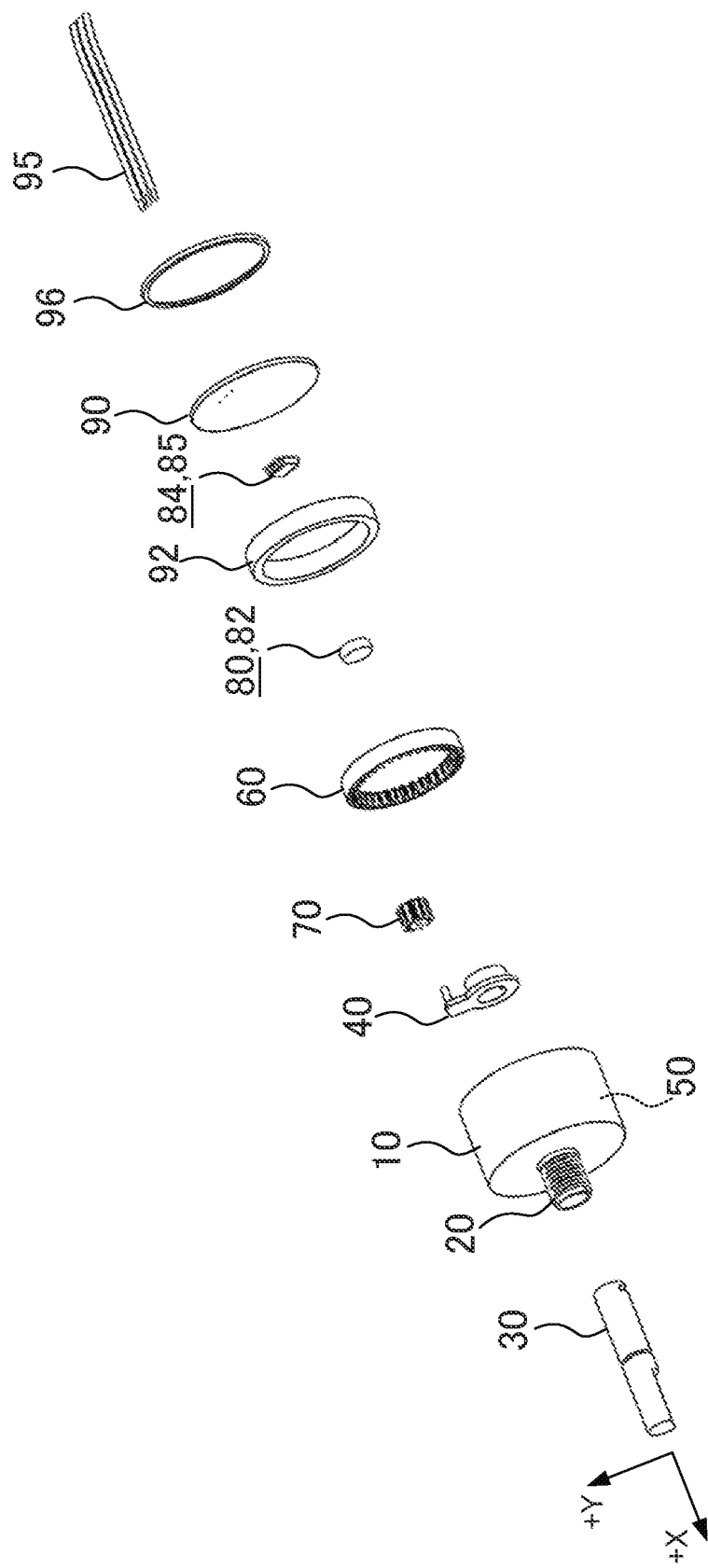
FIG. 9 is an exploded perspective view illustrating an exemplary rotation angle detection apparatus.

FIG. 9 is an exploded perspective view illustrating an example of rotation angle detection apparatus 1.

Spacer 92 has a tubular outer shape as shown in FIG. 9. As shown in FIG. 3, spacer 92 is disposed in such a way that outer peripheral surface 92a of spacer 92 is along inner peripheral surface 13b and upper end surface 92b of spacer 92 is in contact with surface 13a. Upper end surface 92b extends from surface 13a in the radically inward direction (−Y direction). Surface 12a that extends in −Y-direction defines, with inner peripheral surface 12b, an accommodation space in which movable-side internal gear 60 fits, as described above. Spacer 92 has a predetermined length in the tube axial direction (vertical direction) in order to separate magnet 82 disposed at disc-shaped bottom portion 60b from magnetic sensor 85 disposed on wiring board 90 at a predetermined distance.

Wiring board 90 has a disc shaped outer shape as shown in FIG. 9. As shown in FIG. 3, wiring board 90 fits in the third space 13. Wiring board 90 is fixed to lower end surface 92c of spacer 92 with an adhesive. Wiring board 90 is thus disposed so as to be separated from disc-shaped bottom portion 60b where magnet 82 is disposed. Lead wire 95 is connected to a wire on wiring board 90. The gap between the outer peripheral surface of wiring board 90 and inner peripheral surface 13b is closed by the sealing member 96.

Rotation angle detection apparatus 1 according to the above embodiment includes: case 10; shaft 30 rotatably disposed in case 10; rotating body 40 disposed so as to rotate integrally with shaft 30; fixed-side internal gear 50 which is disposed concentrically with shaft 30 and fixed to case 10; movable-side internal gear 60 which is disposed concentrically with shaft 30, is rotatably disposed in case 10, and has a number of teeth different from the number of teeth of fixed-side internal gear 50; external gear 70 which is rotatably disposed at a position separated from shaft 30 of rotating body 40 and meshes with fixed-side internal gear 50 and movable-side internal gear 60; and detection section 80 that detects the rotation angle of movable-side internal gear 60.

The above configuration enables obtainment of a large reduction ratio for movable-side internal gear 60 is rotatably disposed in case 10, and external gear 70 meshes with fixed-side internal gear 50 and movable-side internal gear 60. Fixed-side internal gear 50 and movable-side internal gear 60 are thus do not necessarily have small diameters, thereby eliminating the need for increasing the dimensional accuracy and assembly accuracy of, for example, movable-side internal gear 60. This configuration thus makes the reduction of cost possible. In addition, since it is not necessary to dispose the gears in multiple stages, the apparatus can be made thin.

In addition, rotation angle detection apparatus 1 according to the above embodiment includes fixed-side internal gear 50 and movable-side internal gear 60 disposed so as to overlap (substantially flush with) each other in the vertical direction. This makes it possible to further reduce the apparatus thickness.

The hypocycloid mechanism according to the above embodiment would obtain a large reduction ratio even with a smaller number of gears. Thus, it is possible to reduce the number of components, thereby reducing the cost.

Gap GP in rotation angle detection apparatus 1 according to the above embodiment has a size of 0.5% to 5% relative to the diameter of movable-side internal gear 60 even when gap GP between movable-side internal gear 60 and case 10 becomes narrow due to external stress or heat shrinkage of the members in the apparatus. This configuration allows movable-side internal gear 60 to avoid becoming non-rotatable.

Further, gap GP in rotation angle detection apparatus 1 according to the above embodiment is wider on the −X side (lower end side of the outer peripheral portion of movable-side internal gear 60) than on the +X side (upper end side of the outer peripheral portion of movable-side internal gear 60). Gap GP on the −X side is wider toward the −X side. Gap GP set to be wider on the −X side, which becomes narrow upon application of a large external force to case 10, is capable of still maintaining a predetermined width, thereby preventing movable-side internal gear 60 from becoming non-rotatable.

Further, gap GP in rotation angle detection apparatus 1 according to the above embodiment contains a lubricant having a consistency of 200 to 350. This can prevent movable-side internal gear 60 from inadvertently moving in gap GP, thereby preventing the generation of sound and vibration.

In addition, all of the above embodiments are merely illustrative of embodiments in carrying out the present invention, and the technical scope of the present invention should not be construed as being limited thereto. That is, the present invention can be carried out in various forms without departing from the spirit and the main features thereof.

In the above embodiment, detection section 80 including magnet 82 and magnetic sensor 85 detects the rotation angle of movable-side internal gear 60, however, the present invention is not limited thereto. For example, a method may be employed in which movable-side internal gear 60 is irradiated with visible light or infrared light, and the rotation angle of movable-side internal gear 60 is detected based on the change in the amount of light reflected or transmitted by movable-side internal gear 60. In addition, a contact-type detection section may also be employed which includes a brush in place of magnet 82, and a resistor in place of magnetic sensor 85.

Although embodiments of the present invention have been described and illustrated in detail, the disclosed embodiments are made for purposes of illustration and example only and not limitation. The scope of the present invention should be interpreted by terms of the appended claims.

What is claimed is:

1. A rotation angle detection apparatus, comprising:
    a housing;
    a rotating shaft rotatably disposed in the housing;
    a rotating body disposed so as to rotate integrally with the rotating shaft;
    a first internal gear disposed concentrically with the rotating shaft and having an internal gear configuration with a tooth portion formed on an inner peripheral surface facing the rotating shaft, and fixed to the housing;
    a second internal gear disposed concentrically with the rotating shaft to overlap the first internal gear in a direction along the rotating shaft, and rotatably disposed in the housing, the second internal gear having an internal gear configuration with a tooth portion formed on an inner peripheral surface facing the rotating shaft with a number of teeth different from a number of teeth of the first internal gear;
    an external gear rotatably disposed at a position separated from the rotating shaft and inside the first internal gear and the second internal gear in the rotating body, the external gear having an external gear configuration with a tooth portion formed on an outer peripheral surface facing the inner peripheral surface of the first internal gear and the inner peripheral surface of the second internal gear, the tooth portion formed on the outer peripheral meshing with the first internal gear and the second internal gear; and
    an integrated circuit that detects a rotational angle of the second internal gear based on a rotation amount of the second internal gear.

2. The rotation angle detection apparatus according to claim 1, wherein:
    the housing includes an accommodation space into which the second internal gear is rotatably fitted.

3. The rotation angle detection apparatus according to claim 2, wherein:
    a gap between an outer peripheral surface of the second internal gear and an inner peripheral surface of the accommodation space has a size from 0.5% to 5% relative to a diameter of the second internal gear.

4. The rotation angle detection apparatus according to claim 3, wherein:
    the gap extends relative to the second internal gear in a radial direction of the rotating shaft.

5. The rotation angle detection apparatus according to claim 4, wherein:
    the gap becomes wider in a radially outward direction from one side toward another side in a direction along the rotating shaft.

6. The rotation angle detection apparatus according to claim 3, wherein:
    a lubricant housed in the gap has a consistency of 200 to 350.

7. The rotation angle detection apparatus according to claim 1, wherein:
    the integrated circuit includes
    a magnetic sensor which is disposed so as to face a magnet disposed at the second internal gear, the magnetic sensor converting a direction of a magnetic field emitted from the magnet into a change in an electric signal, and outputting the change.

* * * * *